United States Patent
Moseley, III

(10) Patent No.: US 6,228,316 B1
(45) Date of Patent: May 8, 2001

(54) POLYPROPYLENE FILM SUITABLE FOR USE IN IN-MOLD LABELING PROCESS

(76) Inventor: Ben P. P. Moseley, III, 13 Winburne Dr., New Castle, DE (US) 19720

( * ) Notice: Subject to any disclaimer, the term of this patent is extended or adjusted under 35 U.S.C. 154(b) by 0 days.

(21) Appl. No.: 09/065,737

(22) Filed: Apr. 24, 1998

(51) Int. Cl.⁷ ..................................................... B29C 43/18
(52) U.S. Cl. ...................................... 264/509; 156/DIG. 9
(58) Field of Search .................................. 428/34.1, 35.7, 428/36.4, 36.5, 36.8, 36.9, 36.91, 304.4, 317.9, 500, 523, 910; 264/509; 525/240, 425; 156/DIG. 9

(56) References Cited

U.S. PATENT DOCUMENTS

| | | | |
|---|---|---|---|
| 4,888,237 | * 12/1989 | Balloni et al. | 428/347 |
| 4,892,779 | * 1/1990 | Leatherman et al. | 428/220 |
| 5,317,035 | * 5/1994 | Jacoby et al. | 521/143 |
| 5,527,601 | * 6/1996 | Crighton et al. | 428/316.6 |

FOREIGN PATENT DOCUMENTS

| | | |
|---|---|---|
| 0492942A2 | 1/1992 | (EP) . |
| 0502396A1 | 9/1992 | (EP) . |
| 0571631A1 | 12/1993 | (EP) . |

* cited by examiner

*Primary Examiner*—Paul Thibodeau
*Assistant Examiner*—D. Lawrence Tarazano
(74) *Attorney, Agent, or Firm*—Caesar, Rivise, Bernstein, Cohen & Pokotilow, Ltd.

(57) ABSTRACT

A voided opaque film based on high crystalline polypropylene having high modulus and low heat shrinkage and low heat distortion properties. Biaxially oriented monolayer film of about 1.75 to 4 mil thickness can be handled without crazing or other handling deficiencies encountered with conventional in-mold label candidates.

4 Claims, No Drawings

POLYPROPYLENE FILM SUITABLE FOR USE IN IN-MOLD LABELING PROCESS

This invention relates to improvements in the manufacture of labels for use with molded plastic containers. In a specific embodiment, it relates to such labels that are intended to be applied in the mold used for manufacturing the plastic container, as a part of the molding process.

BACKGROUND OF THE INVENTION

Thermoplastic polymers have become increasingly popular as packaging materials, both as wrapping materials and as containers. This invention has to do with the use of thermoplastic polymers as containers and more specifically, with the application of labels to such containers.

Plastics are widely used as containers, including bottles, jars and jugs (sometimes generically referred to as "containers" hereinafter) for a great number of liquid and granular solid products, thanks to a spectrum of commercially attractive properties. For example, their light weight substantially decreases the shipping weight of the filled container, thereby lowering the cost of shipping the product to the various locations through which the product passes en route to the consumer. Plastics are amenable to the molding of more complex shapes than is glass. Also, losses incurred due to breakage are significantly reduced as compared with those suffered when using glass containers. Plastic containers are also believed to be less of an environmental problem since the polymer can be disposed of by burning if recycling is not available. Accordingly, a very great percentage of the market for liquids, including beverages, food products and liquid detergents, to name just a few, has now been converted to plastic containers.

In recent years, techniques have been developed for applying labels to molded plastic containers prior to ejecting the containers from their mold. This process is referred to as "in-mold labeling" and the labels used therein as "in-mold labels".

In a typical in-mold labeling operation, a plurality of labels carrying various product identification and description information and indicia are die-cut from a master sheet into the required configuration and loaded into a magazine or other type of loading station. For application to a container, the labels are picked from the magazine by an appropriate transfer means, typically vacuum, and inserted into a predetermined label placement area within a plastic forming mold. When molten plastic is charged into the mold for forming into the desired container shape, the molten plastic material contacts the prepositioned label, which is thereupon adhered to the container at the contact area. The contact area is frequently a very slightly raised area on the mold surface which will result in the formation of an indented panel area on the container, in the shape of the label, into said film having a thickness of about 1.75 to 4.0 mils.

In-mold labeling imposes certain conditions on the label stock that are not required of more conventionally applied labels. Specifically, an in-mold label must be stiffer than a label that is applied outside the mold in order that they can be applied to the container by the pick and place technique described in the previous paragraph. If the labels lack sufficient stiffness, they will flex during the transfer operation and, as a result, they will not be uniformly drawn into the mold and what will appear as a wrinkled label will result. Moreover, the heat encountered in the mold may cause the label to soften and an imperfection may be created at the point where the label is seized for transfer to the mold. Still further, label flex during the transfer and application may result in crazing. In order for conventional films to have sufficient stiffness to serve as in-mold labels, the films must be thicker than most conventional films, thus increasing their cost.

Another, and perhaps even more critical, requirement is that the label must undergo a minimum of shrinkage and/or distortion resulting from the heat encountered when it contacts the mold and the freshly molded, and thus still quite hot, container in the mold. Films presently being used as in-mold labels undergo a relatively high degree of heat shrinkage when they are applied in the mold. This is particularly a problem in the case where the container has the indented label placement panel described above. If the label undergoes a high degree of heat shrinkage, it will not fill the label placement panel completely. This is considered an aesthetic flaw in the labeling.

The preferred in-mold label stock in the art today is a multilayer film comprised of a biaxially oriented opaque core layer having a thin layer of an opacified polymer extrusion coated on at least one of its surfaces following longitudinal drawing and prior to transverse drawing. When the structure is thereafter subjected to transverse drawing, the surface layer(s) is (are) only drawn monoaxially. Accordingly, the composite structure is subject to an undesirable degree of heat shrinkage when exposed to the elevated temperatures encountered in in-mold labeling. To minimize this shrinkage, and also to ensure that the film will possess the required stiffness to be handled in the pick and place operation, the film is prepared in a thickness greater than 400 gauge, i.e., greater than 4 mils thickness. Even so, heat shrinkage as great as 5% is frequently observed. When this label is placed in a label placement panel on a container, a clearly perceptible gap results between the label and the outer periphery of the label placement panel.

Thus, presently used in-mold labels are not entirely satisfactory with respect to critical requirements. Additionally, being composites, they have other shortcomings. For example, the composite films usually have very smooth surfaces and, accordingly, air is sometimes trapped between the film and the surface to which it is applied. This can lead to blister or bubble formation between the label and the container, an aesthetic defect. Additionally, composite films are subject to crazing of the surface layers, which leads to another aesthetic defect.

It is the object of this invention to provide a film based on polypropylene that avoids at least the deficiencies cited above and provides an improved stock for use in in-mold labeling of plastic containers.

BRIEF DESCRIPTION OF THE INVENTION

The invention to be described hereinafter is a biaxially oriented, opaque, monolayer film comprised of polypropylene, said film having a thickness of about 1.75 to 4.0 mils and containing about 4 to 30% by weight, based on the combined weight of the polypropylene and filler, of a void-producing, opacifying filler.

The invention also includes a label suitable for use in the in-mold labeling process wherein a label carrying product identification and description indicia and information is inserted into a predetermined label placement area within a mold and a plastic container is thereafter formed in that mold, being brought into contact with the label in the label placement area as said container is being formed and the said label is thereupon adhered to the container at the desired location on the container as said container is being formed, which improvement comprises said label being a biaxially oriented, opaque, monolayer film comprised of polypropylene said film having a thickness of about 1.75 to 4.0 mils and containing about 4 to 30% by weight, based on the combined weight of the polypropylene and filler, of a void-producing, opacifying filler.

The invention also includes an improvement in the process of in-mold labeling wherein a label carrying product identification and description indicia and information is inserted into a predetermined label placement area within a mold and a plastic container is thereafter formed in that mold, being brought into contact with the label in the label placement area as said container is being formed and the said label is thereupon adhered to the container at the desired location on the container as said container is being formed, which improvement comprises said label being a biaxially oriented, opaque, monolayer film comprised of polypropylene said film having a thickness of about 1.75 to 4.0 mils and containing about 4 to 30% by weight, based on the combined weight of the polypropylene and filler, of a void-producing, opacifying filler.

DETAILED DESCRIPTION OF THE INVENTION

The present invention is based on the finding that monolayer opaque polypropylene films, which have heretofore been virtually unknown and unused in the art, have improved heat shrinkage and stiffness properties that make them particularly well suited for use in the in-mold labeling process as compared to the products presently being used in this application.

The films of the invention can be made with conventional isotactic polypropylene of commerce. Suitable Ziegler polypropylenes are the commercially available isotactic polypropylenes having a melt flow rate between about 2 and 10 gm/10 min at 230° C. and 2.16 Kg. load and a DSC melting point of about 160 to 166° C. One polypropylene that can be used is the isotactic homopolymer having a melt flow rate of about 3.5 dg/min at 230° C. and 2.16 kg. load, available from Aristech Chemical Corporation, Pittsburgh, Pa. Suitable polypropylenes are also available from Montell, Inc. Wilmington, Del., Exxon Chemical Company, Baytown, Tex. and Fina Oil and Chemical Co., Deer Park, Tex.

The best combination of stiffness and low shrinkage values has been observed when the films contain a highly crystalline polypropylene species. The term highly crystalline, as used herein refers to a polypropylene species having an isotactic index of at least 93. The isotactic index parameter is also indicated by a xylene insoluble content of at least 93%. One polypropylene species of this high crystallinity level is the product available from Amoco Chemical Co. under the trade name Amoco 9117. This polymer has a melt flow rate of about 2 grams/10 minutes at 230° C. under 2.16 kg. load; flex modulus of 275,000 psi (D790A); and heat deflection temp. of 235° F. (ASTM D648).

High crystalline polypropylene species also include nucleated polypropylenes. These are conventional isotactic species to which has been added a nucleating agent for the specific purpose of increasing the crystalline structure. Nucleated polypropylenes are characterized by higher flex modulus and also by higher heat deflection temperatures. One useful nucleated polypropylene is the product sold under the designation ACCPRO 9433 by Amoco Polymers.

One significant aspect of the inventive films is that they are monolayer structures whereas the films presently employed in in-mold labeling applications are composites of at least two layers wherein the various layers are comprised of different polymeric materials. The term monolayer is intended to convey the meaning that the entire film structure is comprised of a single polypropylene or polypropylene composition. The film, for reasons that will be discussed hereinafter, can be constructed in multiple layers, but all layers will be of the same polymeric material and the same composition in terms of the functional additives contained therein and are preferably extruded by the same extruder. The films presently employed in in-mold labeling applications are composites of at least two layers wherein the various layers are comprised of different polymeric materials.

Heretofore, attempts to prepare labels for in-mold labeling have been unsuccessful or they produced marginally acceptable products unless the films were significantly thicker than was economically desirable. To prepare a sufficiently stiff material at the most desirable thickness, it was found necessary to use composite films but even these materials are only marginally satisfactory. The films according to this invention are found to be sufficiently stiff for use in in-mold labeling applications at a thickness comparable to or less than that of the composite films heretofore used in the in-mold labeling process.

Labels prepared with the monolayer structure according to this invention are also found to be an improvement over labels presently used in in-mold labeling due to an increased dimensional stability. In-mold labels made of composite film structures are subject to a significant degree of heat shrinkage when they are brought into contact with a freshly molded and, accordingly, still hot container. Since the label is expected to fit into a precisely predetermined area on the surface of the container, this tendency to shrink is a troublesome quality issue. A shrinkage greater than about 4% is aesthetically unacceptable and in some cases can be cause for rejection. In-mold labels prepared with opaque monolayer films according to this invention exhibit shrinkage less than about 3% when exposed to temperatures such as are encountered in the mold. Films prepared with the high crystalline polypropylene described above exhibit shrinkage of about 1.5% or less when exposed to conditions such as are encountered in the mold.

Another significant characteristic of the films of the invention is that they are opaque and internally voided. Opacity due to internal voiding is, per se, well known to the polypropylene film art although no instance of its being practiced with monolayer films is known at the present time. It is well known to create opacity in films by including, in the film forming composition, a particulate filler material that, during the stretching operation, causes the formation of microvoids in the polymer matrix, whereby the film is made opaque. Typical void forming particulates include both inorganic materials and microspheres of polymeric materials that are compatible with the polypropylene matrix but which retain their integrity when the polypropylene is melted for molding.

Voiding of the polypropylene matrix has several favorable effects on the efficacy of the inventive films as in-mold labeling candidates. The presence of the void-forming filler in the films causes a slight degree of roughness on the film surface, although this roughness is not perceptible to the casual observer and it does not detract from the aesthetic quality of the film. This surface roughness of the films of the invention allows air to escape readily from under the label when it is applied to the container and a vacuum is applied to ensure good contact between container and label. The rough surface also provides more bonding surface area for coatings such as adhesives, thereby improving the contact between the label and the container.

In contrast, the surfaces of the conventional films presently used for in-mold labeling are smooth, much more so than are those of the films of the invention. When such labels are applied to the container and vacuum is applied to draw the label into contact with the container, air does not escape so easily and it is not uncommon for air to remain trapped behind the label. This entrapped air can lead to the formation of bubbles and blisters. This is, of course, another quality issue.

Yet another quality problem that exists with the in-mold label candidates of the present art is that of crazing of the surfaces of the composite films that can occur during the drawing operation or during subsequent handling. This crazing is believed to be the result of the voided core and surface layers being crushed by external stresses when the film is bent or creased in the course of being handled in use. Crazing is aggravated with composite films.

As has been discussed hereinabove, in preparation for being applied to containers in the in-mold labeling process, a stack of the labels is die cut from a stack of master sheets and placed in a feeding station such as an appropriate magazine from which they are picked and inserted into the mold. In connection with the die cutting operation, the monolayer opaque films of this invention offer at least two advantages over the composite film labels of the prior art. One such advantage is that they are thinner than the composite films and thus a greater number of them can be cut at one time.

During the die cutting operation, the friction between the cutting die and the film causes a build up of heat on the die. In a prolonged cutting run, this heat build-up can raise the temperature to a point at which melting or softening of the polymer in the functional layers of the composite label stock can take place. Such melting or softening can cause the edges of the cut labels to stick together (edge welding), which can lead to multiple feeding of labels during a molding run, which, in turn, can lead to jamming and process interruptions.

The edge welding problem is avoided when using the monolayer opaque films of this invention by several qualities of the films. The films are thinner than the presently used multilayer label stock so that less work is required for the cutting and thus there is less heat build-up. In addition to being thinner, the films are composed of a relatively large volume of void space, which further reduces the work input required in the cutting operation and further reduces the heat build-up.

Another beneficial result of these two factors is that the cutting die, by doing less work, can retain its sharp cutting edge for a longer time.

Film forming and drawing to effect orientation can be carried out by conventional techniques, i.e. the well known tubular (bubble) process or the equally well known tenter process can be employed. When the films are drawn by the bubble process, the draw is effected simultaneously and substantially uniformly in the machine and cross directions to about 3 to 7× and preferably 6 to 7× in each direction. Using the tenter process, drawing is carried out sequentially to about 4 to 7× in the machine direction and 7 to 11× in the cross direction. More preferably, in the tenter process, drawing is carried out to 4 to 6× in the machine direction and 8 to 10× in the cross direction.

The thickness of the films according to the invention is typically about 1.75 to 4 mil. A preferred thickness is about 1.75 to 3 mil. This preferred thickness is greater than a typical polypropylene packaging film, but less than is required of the films used as in-mold labels in the art today.

The films of the invention can be of lesser thickness than prior art in-mold labels due to the superior stiffness characteristics of the opaque monolayer film described herein. It has been found, that, for reasons not yet understood, the opaque monolayer films of this invention exhibit greater stiffness relative to their thickness than do the composite films presently employed in in-mold labeling. Accordingly, the opaque monolayer films of the invention can be at least as stiff as the composite film labels presently used, even though they are significantly thinner.

The stiffness referred to in this context is determined with an instrument known as a Handle-O-Meter Stiffness Tester (Thwing-Albert Instrument Company, Philadelphia, Pa.). Using this tester, the resistance to flexure of a film sample is measured by a strain gauge affixed to the end of a beam. A penetrating arm is affixed to the opposite end of the beam. The sample is flexed by forcing it into a groove or slot in a horizontal platform upon which the sample rests. An indicating micro ammeter, wired to the strain gauge, is calibrated in grams of load sensed by the gauge. The rigidity is read directly from the meter and expressed as grams per inch of sample width.

At a thickness suitable for in-mold labeling, an opaque monolayer film of conventional isotactic polypropylene according to this invention typically exhibits a Handle-O-Meter stiffness on the order of about 17 gms/inch in the machine direction and about 26 grams/inch in the cross direction (usually expressed as simply 17×26). An opaque monolayer film of the high crystalline polypropylene described above has a Handle-O-Meter stiffness on the order of about 25×38. This has been found to be a sufficient thickness to permit satisfactory handling in the in-mold labeling process. By contrast, the films presently used as in-mold labels have a Handle-O-Meter stiffness on the order of about 58×77, which is greater than is required. However, these labels are greater than twice the thickness of the films of the invention and they are composite structures which are necessarily more expensive than the inventive films.

As stated above, the films are opacified by including in the formulation a sufficient amount of a particulate filler material that cause formation of microvoids in the polymer matrix when the film is drawn to effect orientation. Virtually any inorganic particulate can be employed as the voiding filler, provided it is of a sufficient particle size. Generally, the filler should have a particle size between about 0.7 and 5 microns. Commonly used particulate voiding fillers include, by way of example, calcium carbonate, silicon dioxide, aluminum silicate and magnesium silicate. A preferred opacifier is calcium carbonate. Calcium carbonate is the filler most commonly used in the art for opacifying, not only films intended for in-mold labeling, but for other types of opaque film as well.

Certain organic polymer fillers are also known in the art such as, e.g., particulate nylon, polystyrene and polyesters such as polybutylene terephthalate. These materials can also act as voiding fillers for the films of the invention.

For the purpose of opacifying the films of this invention, an opacifier concentration of about 4 to 30% by weight, based on the total weight of the polypropylene/opacifier mixture is employed. The most preferred concentration of the opacifier is between about 8 and 20%.

In addition to the opacifying filler, other conventional additives can be included in the film composition so long as their presence does not negatively impact the effectiveness of the composition for use in the in-mold label application. Suitable such conventional additives include, by way of example, antioxidants, pigments, orientation stress modifiers, flame retardants, antistatic agents, antiblock agents, antifoggants and slip agents. These additives typically do not contribute to void formation as does the calcium carbonate.

One type of non-voiding additive that can be used to particular advantage is a coloring pigment such as titanium oxide. Pigment grade inorganic materials do not cause noticeable voiding as their particle size is not sufficiently great. With specific reference to titanium dioxide, it is found that the aesthetic impact of the labels formed with the film forming compositions and resultant films of the invention is heightened when this material is included. As is well known, titanium dioxide is a white pigment. Pigments of other colors can equally be included for their aesthetic value.

Another additive that is frequently employed in the films of this invention is an extrusion aid and orientation stress modifier, employed to reduce the energy required to extrude and orient the polypropylene. One extrusion aid that is used to advantage is an ethylene-propylene copolymer such as the 9.5% ethylene copolymer with propylene sold under the designation E3208 by Epsilon Products Company, (Marcus Hook, Pa.). These additives are normally employed in concentrations of about 5 to 10% by weight based on the total weight of the film-forming formulation.

Other useful extrusion aids include other ethylene polymers and copolymers and the low molecular weight hydrocarbon resins such as those of the Piccolyte®, Regalite® and Regal-Rez® lines from Hercules Incorporated, Wilmington, Del. and the Escorez® line from Exxon Chemical Co., Houston, Tex.

In order to be able to apply decorative materials, such as printing, to the surfaces of the labels prepared with the compositions according to this invention, it is desirable or even necessary to treat the film surfaces to create polar sites on the surfaces. This is accomplished according to known techniques via an oxidative treatment. Typical such treatments are corona treatment, treatment with an oxidative flame or even with a chemical oxidizing agent. Flame or corona treatment are the preferred treatments. For most cases, a treatment sufficient to create a surface energy equal to about 36 dynes per $cm^2$ will suffice. Typically, both surfaces are treated so that one side can be printed and one has improved adhesion to an adhesive that may be employed to adhere the label to the container to which it is to be applied. The creation of polarity on the surface of the films also allows them to be metal coated if that is desired.

The films of the invention have been described as monolayer films, meaning that they are prepared with a single polymer composition throughout the entire thickness of the polymer. This is in contrast to most polypropylene films found in the marketplace today, which are composed of a polypropylene core to which are applied layers containing other polymers or other polymer formulations for various functional purposes.

Ideally, the films of the invention are prepared of a single layer containing the high crystalline polypropylene composition and any desired additive(s) as discussed above. However, since composite films are the norm, film production units are fitted, most of the time, with multi-channel dies for forming such multilayer films. In order to avoid the expense and equipment down-time involved in changing to a single channel die when it is desired to manufacture films according to this invention, it is convenient and economically desirable to prepare the films in a multilayer form wherein each layer is comprised of the same polypropylene composition. Films prepared in this manner, being of the same polymer throughout their cross section are properly referred to as monolayer films as that term is used in this description.

In the usual film manufacturing operation where it is desired to prepare a film from several streams of polymer, a separate extruder is provided for each stream of polymer. This is required since the streams contain different polymers or different formulations of the same polymer. Since the same polymer formulation is being used in each of the layers of the films of this invention, it is convenient to feed each channel of the multi-channel die from the same extruder. It was surprising to discover that a superior product was produced in this manner to that obtained when the multiple channels were fed from different extruders.

In the examples that follow, the high crystalline polypropylene employed was ACCPRO 9117 from Amoco Polymers, Alpharetta, Ga. This polymer has a melt flow rate of about 2.1 grams/10 minutes (ASTM D1238), a density of 9.1 gm/cc (ASTM D1505), flex modulus of 275,000 psi (ASTM D190), and heat deflection temperature of 235° F. (ASTM D648). The 9.5% ethylene—propylene ($C_2C_3$) copolymer was Epsilon E3208 from Epsilon Chemical Co. The conventional polypropylene was Escorene PP 4822 (Exxon Chemical Co. Houston, Tex.), an isotactic polypropylene marketed specifically for use as an oriented film resin, having a melt flow rate of about 3.4 g/10 minutes.

EXAMPLE 1

The following film forming formulation was prepared:

| | |
|---|---|
| ACCPRO 9117 | 76.6parts |
| 9.5% $C_2C_3$ copolymer | 7.0parts |
| Amp. LP 20882 | 15.0parts |
| Amp. 110617 | 1.4parts | and extruded using a standard commercial, production scale single screw extruder. Ampacet LP 20882 is a mixture of 34.3% ACCPRO 9117; 10.8% $TiO_2$ and 54.2% $CaCO_3$ sold by Ampocet Corporation, Tarrytown, N.Y. Amp. 110617 is a concentrate of 50% TiO2 and 50% polypropylene.

The composition was then filmed using large scale pilot plant equipment and drawn at various draw ratios and conditions via the tenter process to prepare films of a thickness between and 1.85 and 1.97 mils. Heat shrinkage and stiffness of these films were determined and compared with these properties exhibited by a specimen of the presently commercially preferred in-mold label stock. Pertinent data are recorded in the table below.

EXAMPLE 2

The work of Example 1 was repeated using a conventional isotactic polypropylene as the polypropylene component. The formulation was as follows:

| | |
|---|---|
| Exxon 4822 | 45.8parts |
| 9.5% $C_2C_3$ copolymer | 7.0parts |
| Amp. LP20903 | 40.7parts |
| Amp. 110617 | 6.5parts |

This composition was treated and tested in the same manner as was that of Example 1. Pertinent data are likewise recorded in the table below.

|  | MACHINE DIRECTION | | | CROSS DIRECTION | | |
| --- | --- | --- | --- | --- | --- | --- |
| SAMPLE | DRAW RATIO | TEST TEMP. °C. | SHRINK-AGE | DRAW RATIO | TEST TEMP. °C. | SHRINK-AGE |
| 1A | 6.3× | 120 | 0.0 | 8.4× | 120 | 0.0 |
| 1B | 5.5× | 120 | 0.0 | 8.4× | 120 | 0.0 |
| 1C | 5.0× | 120 | 0.0 | 8.4× | 120 | 0.0 |
| 1A | 6.3× | 130 | 0.0 | 8.4× | 130 | 0.0 |
| 1B | 5.5× | 130 | 0.0 | 8.4× | 130 | 0.0 |
| 1C | 5.0× | 130 | 0.0 | 8.4× | 130 | 0.0 |
| 1A | 6.3× | 140 | 1.0 | 8.4× | 140 | 0.5 |
| 1B | 5.5× | 140 | 1.0 | 8.4× | 140 | 0.5 |
| 1C | 5.0× | 140 | 1.0 | 8.4× | 140 | 0.0 |
| 2 | 5.5× | 120 | 1.5 | 8.4× | 120 | 0.0 |
| 2 | 5.5× | 130 | 2.0 | 8.4× | 130 | 0.0 |
| 2 | 5.5× | 140 | 3.5 | 8.4× | 140 | 2.3 |
| CONTROL | — | 120 | 0.0 | — | 120 | 1.5 |
| CONTROL | — | 130 | 1.0 | — | 130 | 3.0 |
| CONTROL | — | 143 | 5.0 | — | 143 | 5.5 |

The control film for these examples was a commercially used material sold under the trade name KIMDURA by Oji-Yuka Synthetic Paper Co., Ltd. Tokyo, Japan. This is a three layer composite polypropylene film of about 4.2 mil thickness.

Each of the films exemplified was run in a commercial in-mold labeling operation and each was found to perform satisfactorily. The plastic material being molded was high density polyethylene, which was injected into the mold at a temperature of about 204° C. The temperature of the surface of the mold where the label was placed was about 200° C.

Examination of the labeled containers indicated that the labels prepared from the films of this invention were commercially preferable to those of the prior art standard label stock since, due to their lower heat shrinkage, they fit more neatly into the label panel on the containers. The label prepared according to the invention using the high crystalline polypropylene completely filled the label placement panel, leaving no gap between the periphery of the label and the inner edge of the label placement panel. A small gap was noticeable with the label prepared with conventional isotactic polypropylene on close inspection. With the standard art recognized label, close inspection was not required in order to see the gap between the label and the edge of the panel.

While the films of the invention have been described as being suitable for use as labels for use in the in-mold labeling process, it will be understood that their utility is not so limited. Upon application of the appropriate adhesive compositions, they can also be used in pressure sensitive label applications and also in cut and stack labeling.

What is claimed is:

1. A process for applying a label to a plastic container using an in-mold labeling process comprising the steps of providing the label comprising a biaxially oriented, opaque, monolayer film including polypropylene, said film having a thickness of about 1.75 to 4.0 mils and containing about 4 to 30% by weight, based on the combined weight of the polypropylene and filler, of a void-producing opacifying filler, providing said label with product identification and description indicia and information, inserting said label into a predetermined label placement area within a mold, and forming the plastic container in said mold, in a manner to bring said container into contact with the label in the label placement area as said container is being formed, whereby said label is thereupon adhered to the container at the desired location on the container.

2. A process for applying a label according to claim 1, wherein the step of providing the label includes providing the polypropylene as a high crystalline polypropylene having a xylene insolubles content greater than 93%.

3. A process for applying a label according to claim 2, wherein the step of providing the label includes providing a label which contains about 5 to 10% by weight of an extrusion aid.

4. A process for applying a label according to claim 2, wherein the step of providing the label includes providing the polypropylene as a nucleated isotactic polypropylene.

\* \* \* \* \*